United States Patent
Love

(10) Patent No.: US 6,694,844 B2
(45) Date of Patent: Feb. 24, 2004

(54) APPARATUS TO RECOVER ENERGY THROUGH GRAVITATIONAL FORCE

(76) Inventor: Ralph E. Love, 102 Ridgefield Dr., LaGrange, GA (US) 30241

( * ) Notice: Subject to any disclaimer, the term of this patent is extended or adjusted under 35 U.S.C. 154(b) by 0 days.

(21) Appl. No.: 10/120,739

(22) Filed: Apr. 12, 2002

(65) Prior Publication Data

US 2003/0066382 A1 Apr. 10, 2003

Related U.S. Application Data

(66) Substitute for application No. 09/399,541 on Sep. 20, 1999, now abandoned.

(51) Int. Cl.[7] ............ F16F 15/10; G05G 1/00; G05G 3/00
(52) U.S. Cl. ............ 74/573 R; 74/572; 74/574; 74/84 R; 74/84 S; 74/61; 74/DIG. 9
(58) Field of Search .......... 74/572–574, DIG. 9, 74/61, 84 S, 84 R; 91/176; 474/57, 50, 49; 416/41; 60/721

(56) References Cited

U.S. PATENT DOCUMENTS

| | | | | |
|---|---|---|---|---|
| 3,897,692 A | * | 8/1975 | Lehberger | 74/84 S |
| 4,373,926 A | * | 2/1983 | Fullerton | 474/57 |
| 4,406,584 A | * | 9/1983 | Stepp | 416/41 |
| 4,579,011 A | * | 4/1986 | Dobos | 74/84 R |
| 4,586,426 A | * | 5/1986 | Dibrell et al. | 91/176 |
| 4,784,006 A | * | 11/1988 | Kethley | 74/84 R |
| 5,388,469 A | * | 2/1995 | Woltering | 74/61 |
| 5,520,583 A | * | 5/1996 | Balingit et al. | 474/50 |
| 5,582,555 A | * | 12/1996 | Miller | 474/49 |
| 6,237,342 B1 | * | 5/2001 | Hurford | 60/721 |

FOREIGN PATENT DOCUMENTS

| | | | | |
|---|---|---|---|---|
| FR | 2461125 | * | 1/1981 | 60/721 |
| JP | 52-4952 | * | 1/1977 | 74/DIG. 9 |
| JP | 58-88472 | * | 5/1983 | 74/DIG. 9 |
| JP | 60-150484 | * | 8/1985 | 74/DIG. 9 |
| JP | 8-61214 | * | 3/1996 | 74/DIG. 9 |

* cited by examiner

Primary Examiner—Vinh T. Luong
(74) Attorney, Agent, or Firm—Smith, Gambrell & Russell, LLP

(57) ABSTRACT

A gravity apparatus having a wheel-like, connected, encircling surface, includes an axially horizontal track which has an interior surface which weighted objects contact and are carried around the interior surface. The interior surface is a connected, encircling, wheel-like surface, is not a round circle or a cylinder, but has an offset center of rotation closest to a side which approaches perpendicular, the weighted objects are carried by spokes attached to a support hub through the offset center of rotation. A plurality of spokes extend diametrally of the track in axially and circumferentially spaced array. Weighted objects are mounted on opposite ends of each spoke. The offset center causes the spokes to move axially diametrally of the track and extend the weights to rise and lower as the weights traverse the path of the interior surface. Optional bearings on the weights, wheel, and at the hub-spoke interface minimize friction.

6 Claims, 1 Drawing Sheet

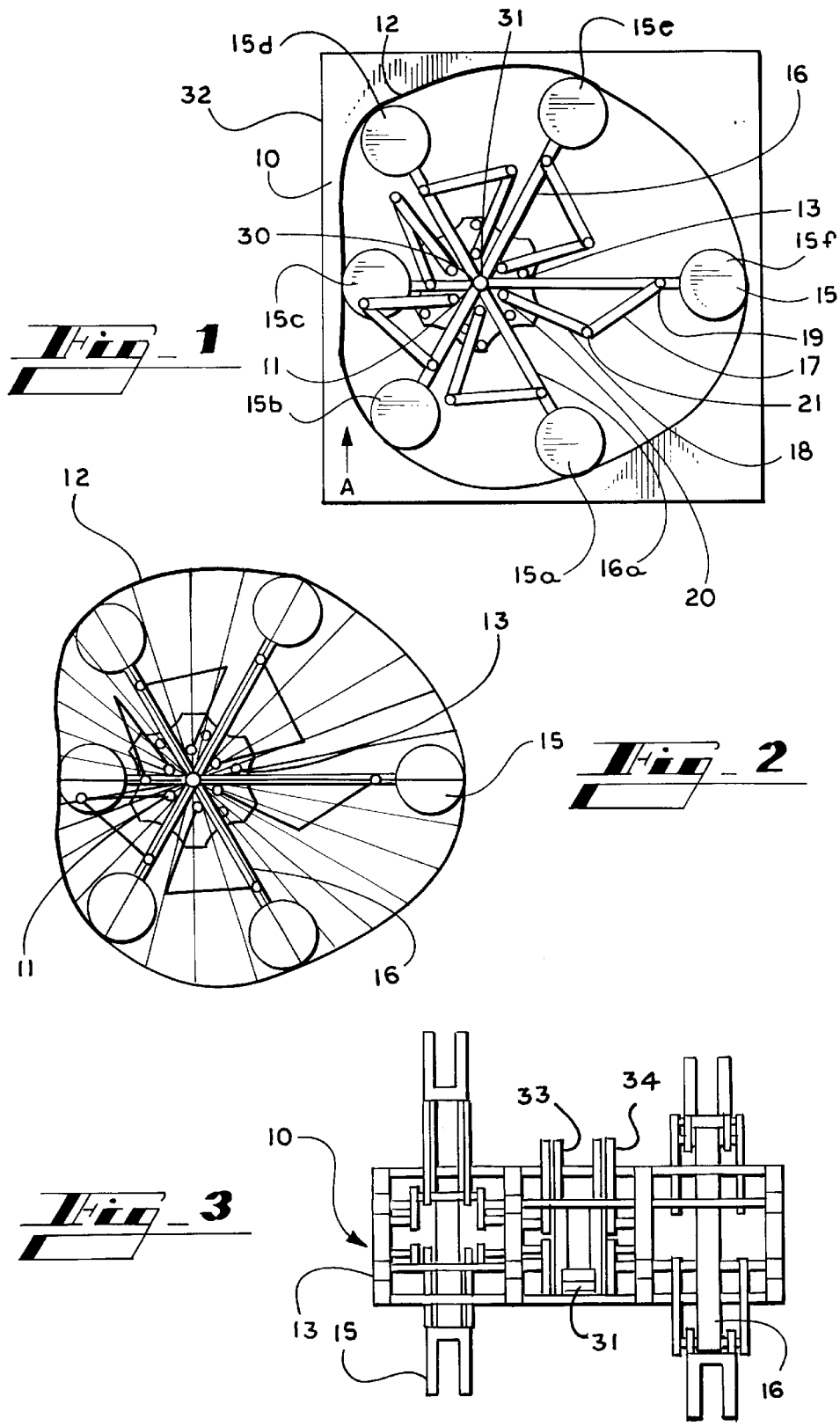

APPARATUS TO RECOVER ENERGY THROUGH GRAVITATIONAL FORCE

This application is a substitute of prior application number 09/399,541 filed on Sep. 20, 1999 now abandoned.

BACKGROUND OF THE INVENTION

The present invention is in the field of devices for conserving energy. Among the variety of known types of different devices for conserving energy various flywheels have been invented generally to achieve two main objectives. First, a rotating object may absorb energy from a power source during the greater portion of its revolution and then deliver the energy as useful work during the remaining portion of its revolution. Second, a rotating object such as a flywheel mounted to an engine smooths out the speed fluctuations resulting from power inputs from the engine's cylinders. In each of these cases the rotating flywheel receives and stores energy, thereby conserving the energy. An early attempt at a rotatable machine was designed by Leonardo DeVinci and included a plurality of small weights mounted to the circumference of a rotating flywheel. The theory of such a machine was that the weights would fail or move outwardly of the rotating flywheel, thereby conserving energy. Once the flywheel reached a constant state of rotation the weights would remain at the outermost position, thereby simply increasing the overall effective diameter of the flywheel.

This invention relates to gravity operated or assisted machines for supplying, conserving, and/or recovering power, for example for the purpose of rotating a shaft, with the shaft in turn driving any of various devices including generators, displaying devices, toys, etc.

SUMMARY OF THE INVENTION

According to the invention a wheel-like or connected, encircling, surface surrounds an offset axial shaft. A hub is connected to the offset shaft and slidably carries a multiplicity of diametrally movable spokes. Weighted objects are secured on opposite ends of each spoke. The spokes are spaced apart axially along the wheel and are also circumferentially spaced apart. The weights contact the interior surface, or track, of the wheel and are carried around its interior surface. The interior surface is not circular or cylindrical, but has an offset center of rotation closest to a side which approaches perpendicular. This forces the spokes to slide through the center of rotation and elevates and lowers the spokes and weights. When the spokes are fully elevated they are overbalanced by the weights which then move gravitationally downwardly. This turns the hub to which the spokes are attached and drives the shaft, which may be coupled to a rotary load. A number of weighted spokes can be provided to insure uniform rotational motion. Bearings may be provided on the weights at the ends of the spokes. Bearings may be further provided to facilitate axial sliding of the spokes.

It is an object of the present invention to provide a device which conserves energy through gravitational force. A further object of the present invention is to provide a device which recovers energy through gravitational force.

Other and further features, objects and advantages of the invention will become apparent from the following detailed description taken together with the drawings.

BRIEF DESCRIPTION OF TIE DRAWINGS

FIG. 1 is a front plan view of a gravity apparatus embodying the present invention.

FIG. 2 is a front plan view of a second embodiment of the present invention.

FIG. 3 is a vertical cross sectional view along the center line of FIG. 1.

DESCRIPTION OF THE PREFERRED EMBODIMENTS

Referring to FIGS. 1, 2 and 3 of the drawings there is shown apparatus 10 comprising an axially horizontal wheel-like surface 12 having an offset center of rotation 11. Hub 13 has a center of rotation which coincides with the center of rotation 11 of wheel 12 and has radial spokes 16 slidably connected thereto. Spokes 16 are mounted for movement to hub 13 in its plane of rotation and extend axially outward. Hub 13 is attached to a shaft 30 which may rotate in a bearing 31 and may be mounted in a support frame 32 having a axially horizontal stationary encircling connected surface with interior 33 and exterior 34. An optional slip clutch may be coupled to the shaft. A power takeoff may be connected to the clutch. Any suitable rotary load can be connected to the shaft.

Optionally the shaft 30 may be connected to a motor 30 which may be mounted on the frame 32. A local power supply such as a battery can be mounted along with the motor. Alternatively a remote power supply can be used.

A multiplicity of axially slidable spokes 16 extend diametrally through hub 13. The spokes may extend through ball bearings in the hub. At opposite ends of each spoke are weighted objects 15. The weights may have curved outer sides formed with flanges between which are rotatable bearings. Alternatively, the weights may be circular, spherical, or round, mounted on a spoke for rotation, and optionally may have bearings on the outer surface which contact surface 12.

The present apparatus further includes an arm comprised of two sections 17 and 18, attached to hub 13 at point 20 and to spoke 16 at point 19 for rotation in a plane coincident with the hub's plane of rotation. The two spoke sections are moveably connected at point 21 between the attachment to hub 13 and the attachment to spoke 16 for movement along the plane of movement of spoke 16. This allows the arm to extend and retract as spoke 16 slides through hub 13. Advantageously, the two sections of said arm are of approximately equal length. Preferably, spokes 16 are all of approximately equal length. Advantageously, the weighted objects are of approximately equal weight. The apparatus of the present invention advantageously has at least two spokes, 16, and preferably has at least three spokes. Preferably, the wheel-like surface 12 has a portion of an interior side contacted by the weighted objects which approaches perpendicular. Advantageously, the offset center of wheel-like surface 12 is closest to the side which approaches perpendicular.

In operation of the apparatus, the spokes with weights rotate continuously about the offset axis thereby also rotating hub 13. Spokes 16 are slidably attached to hub 13. An optional motor may be used to start the rotation. When rotation begins the weighted spokes start reciprocating axially. At the lowermost point shown in FIG. 1 the first weight 15a and its spoke 16a starts moving axially upward as indicated by arrow A. This elevates the other weight 15d at the other end of spoke 16a. The spoke continues to move upward while weight 15a moves along the wheel-like surface. When the weight reaches its closest position to the axis of the wheel-like surface, the opposite weight 15d is now disposed to the right of the central vertical axial plane of the wheel-like surface and its leverage is such as to pull the hub 13 clockwise. Weight 15a and all other weights 15b, 15c to the left of the central vertical plane of the wheel-like surface remain close to the surface's axis while their opposite weights 15d, 15e, 15f are extend outwardly as far from the surface's axis as possible. The weights on the extended spoke portions to the right of the central vertical plane of the wheel-like surface keep overbalancing the weights to the left of this plane and keep the hub 13 rotating at substantially constant speed. The optional motor may operate when the apparatus is first started to overcome inertia and may operate occasionally to overcome residual friction. When the speed of the hub reaches or rises above a certain speed, an optional governor cuts out the motor. The governor cuts in the motor when the speed of the hub falls below a certain, set speed. The shaft can drive any desired external rotary load. If an excess load is applied, an optional clutch slips to avoid stalling the wheel.

The apparatus takes full advantage of the gravitational and centrifugal effects of the extended spoke portions and weights which rotate continuously at substantially constant speed. The optional bearings minimize friction. An array of three or more spokes is preferred because this will insure uniform motion. However more or less spokes can be provided if desired.

The apparatus can be used to power a generator, in a commercial installation to drive rotary loads of many types, and like uses. It can be made in suitable sizes for advertising or display purposes, made in small sizes for use as a toy for entertainment purposes. It can be made in suitable sizes for use as a classroom or laboratory educational exhibit. Other uses and applications for the apparatus will readily occur to those skilled in the art. Although a preferred embodiment has been described it will be understood that many variations and modifications are possible without departing from the invention.

What is claimed is:

1. Apparatus comprising a support frame, an axially horizontal stationary encircling, connected surface carried by said support, said surface having an interior and an exterior, an offset center, a plurality of spokes extending diametrally through said offset center of said surface through a rotatable hub at the offset center thereof, said spokes being spaced apart axially and circumferentially of the surface and being axially slidable diametrally of the surface through the hub at the surface's offset center; weighted objects on opposite ends of each of the spokes; said weights contacting the interior of said surface whereby the spokes move axially of the surface upon rotation to raise and lower the weights on the ends of extended portions of the spokes as the weights rotate on the interior of the surface, further including a plurality of arms, each comprised of two sections and attached to the hub at one end and to a spoke at the other end for rotation in a plane coincident with the hub's plane of rotation, said two sections being moveably connected at a point between the attachment to the hub and the attachment to the spoke, for movement along the plane of movement of the spoke, which allows the arm to extend and retract as the spoke slides through the hub.

2. Apparatus as defined in claim 1, wherein said two sections of said arm are of approximately equal length.

3. Apparatus as defined in claim 1, wherein said spokes are of approximately equal length.

4. Apparatus as defined in claim 1, wherein the weighted objects are of approximately equal weight.

5. Apparatus as defined in claim 1, having at least two spokes.

6. Apparatus as defined in claim 5, having at least three spokes.

* * * * *